United States Patent
Chen et al.

(10) Patent No.: US 9,386,431 B2
(45) Date of Patent: Jul. 5, 2016

(54) BATTERY EFFICIENT METHOD TO SEARCH FOR PREFERRED FEMTOCELL

(75) Inventors: Jen Mei Chen, San Diego, CA (US); Mehmet Yavuz, San Diego, CA (US); Sanjiv Nanda, Ramona, CA (US); Manoj M. Deshpande, San Diego, CA (US); Fracesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 12/533,651

(22) Filed: Jul. 31, 2009

(65) Prior Publication Data
US 2010/0035601 A1 Feb. 11, 2010

Related U.S. Application Data

(60) Provisional application No. 61/086,421, filed on Aug. 5, 2008.

(51) Int. Cl.
*H04W 4/20* (2009.01)
*H04W 36/30* (2009.01)

(52) U.S. Cl.
CPC ...................... *H04W 4/20* (2013.01)

(58) Field of Classification Search
CPC ..... H04W 36/30; H04W 48/17; H04W 48/20; H04W 84/045
USPC .................................. 370/331, 332
See application file for complete search history.

(56) References Cited

U.S. PATENT DOCUMENTS

| | | | |
|---|---|---|---|
| 5,794,146 A * | 8/1998 | Sevcik et al. | 455/434 |
| 6,249,678 B1 * | 6/2001 | Mathai et al. | 455/437 |
| 7,089,004 B2 * | 8/2006 | Jeong et al. | 455/436 |

(Continued)

FOREIGN PATENT DOCUMENTS

| | | |
|---|---|---|
| CN | 1613197 A | 5/2005 |
| EP | 1441469 A2 | 7/2004 |

(Continued)

OTHER PUBLICATIONS

3GPP TS 25.304 V6.9.0, "3rd Generation Partnership Project; Technical Specification Group Radio Access Network; User Equipment (UE) procedures in idle mode and procedures for cell reselection in connected mode (Release 6)", Mar. 2006, pp. 1-38.*

(Continued)

*Primary Examiner* — Scott M Sciacca
(74) *Attorney, Agent, or Firm* — Dalei Dong

(57) ABSTRACT

Mobile user equipment (MUE) can be enabled to search for and camp on a preferred node, such as a home base node (HBN), in a battery-efficient manner even when currently camped on another node, such as a macro base node (MBN). When the MBN provides good channel quality, slow rate background intra- and inter-frequency searches can discover the preferred HBN that would otherwise not be discovered or would consume excessive power with continual searching. When channel quality is fair, slow rate background inter-frequency searches can result in timely switching to the preferred HBN. Location hints that indicate proximity of the preferred HBN can be used to trigger slow rate background searches. Neighboring cell searching of neighbor cell listing (NCL) when in channel quality is fair or poor are maintained to prepare for call reselections to available node.

52 Claims, 15 Drawing Sheets

(56) References Cited

U.S. PATENT DOCUMENTS

| | | | |
|---|---|---|---|
| 8,588,773 B2* | 11/2013 | Deshpande | H04J 11/0093 370/328 |
| 2002/0137513 A1 | 9/2002 | Aihara et al. | |
| 2003/0091009 A1* | 5/2003 | Halivaara | 370/335 |
| 2003/0134658 A1* | 7/2003 | Kaminski et al. | 455/552 |
| 2004/0248568 A1* | 12/2004 | Lucidarme | 455/423 |
| 2005/0037778 A1 | 2/2005 | Patel | |
| 2005/0153695 A1 | 7/2005 | Cho | |
| 2006/0084443 A1 | 4/2006 | Yeo et al. | |
| 2006/0092881 A1* | 5/2006 | Laroia et al. | 370/331 |
| 2006/0148486 A1 | 7/2006 | Kim et al. | |
| 2006/0246895 A1* | 11/2006 | Ryu | 455/434 |
| 2007/0129092 A1 | 6/2007 | Doradla et al. | |
| 2007/0135122 A1* | 6/2007 | Dillon et al. | 455/433 |
| 2007/0155421 A1* | 7/2007 | Alberth et al. | 455/553.1 |
| 2007/0275717 A1 | 11/2007 | Edge et al. | |
| 2008/0049702 A1 | 2/2008 | Meylan et al. | |
| 2008/0076412 A1 | 3/2008 | Khetawat et al. | |
| 2008/0096580 A1 | 4/2008 | Montemurro | |
| 2008/0144580 A1* | 6/2008 | Su et al. | 370/332 |
| 2008/0146231 A1* | 6/2008 | Huang et al. | 455/436 |
| 2008/0220784 A1* | 9/2008 | Somasundaram et al. | 455/437 |
| 2008/0225744 A1* | 9/2008 | DiGirolamo et al. | 370/252 |
| 2008/0293419 A1* | 11/2008 | Somasundaram et al. | 455/437 |
| 2008/0305801 A1 | 12/2008 | Burgess et al. | |
| 2009/0022068 A1 | 1/2009 | Iyer et al. | |
| 2009/0047958 A1* | 2/2009 | Rimhagen et al. | 455/436 |
| 2009/0047968 A1 | 2/2009 | Gunnarsson et al. | |
| 2009/0052395 A1* | 2/2009 | Bao et al. | 370/331 |
| 2009/0061892 A1 | 3/2009 | Lee et al. | |
| 2009/0068969 A1* | 3/2009 | Lindoff et al. | 455/161.1 |
| 2009/0092096 A1 | 4/2009 | Czaja et al. | |
| 2009/0104905 A1* | 4/2009 | DiGirolamo | H04J 11/0093 455/434 |
| 2009/0164547 A1 | 6/2009 | Chng et al. | |
| 2009/0238117 A1* | 9/2009 | Somasundaram et al. | 370/328 |
| 2009/0247170 A1 | 10/2009 | Balasubramanian et al. | |
| 2009/0257390 A1* | 10/2009 | Ji et al. | 370/329 |
| 2009/0274123 A1* | 11/2009 | Chang et al. | 370/332 |
| 2010/0014429 A1* | 1/2010 | Kim et al. | 370/241 |
| 2010/0240368 A1* | 9/2010 | Fox et al. | 455/435.3 |
| 2010/0285793 A1 | 11/2010 | Yoon et al. | |

FOREIGN PATENT DOCUMENTS

| | | | | |
|---|---|---|---|---|
| GB | 2358550 A | * | 7/2001 | H04Q 7/32 |
| JP | 2001169339 A | | 6/2001 | |
| JP | 2006041955 A | | 2/2006 | |
| JP | 2006518975 A | | 8/2006 | |
| JP | 2007251884 A | | 9/2007 | |
| RU | 2003133315 A | | 6/2005 | |
| RU | 2280329 C1 | | 7/2006 | |
| TW | 200833139 A | | 8/2008 | |
| WO | WO2004077753 A2 | | 9/2004 | |
| WO | WO2005106523 A1 | | 11/2005 | |
| WO | WO2006100653 | | 9/2006 | |
| WO | 2008025003 | | 2/2008 | |
| WO | WO2008030956 A2 | | 3/2008 | |

OTHER PUBLICATIONS

3GPP: 3rd Generation Partnership Project "Technical Specification Group Radio Access Network; User Equipment (UE) procedures in idle mode and procedures for cell reselection in connected mode." 3GPP TS 25.304 V8.5.0 (Mar. 2009).

Alcatel-Lucent et al: "HNB/HeNB—Closed Subscriber Group (CSG) requirements for UTRA and E-UTRA" 3GPP Draft; SP-080188, 3rd Generation Partnership Project (3GPP), Mobile Competence Centre ; 650, Route Des Lucioles ; F-06921 Sophia-Antipolis Cedex ; France, vol. RAN WG2, No. Shenzhen, China; 20080311, Mar. 11, 2008, XP050139696 the whole document.

International Search Report and Written Opinion—PCT/US2009/052744—ISA/EPO—Jan. 22, 2010.

Nokia Siemens Networks., et al., "E-UTRA Measurements and Cell Reselection Considerations" 3GPP TSG-RAN WG2 Meeting #58bis, vol. R2-072386, R2-071727, No. 58BIS, Jun. 25, 2007, pp. 1-5, XP002500401.

Qualcomm Europe, "Preferred HNB Search" 3GPP Draft; R2-084346 Preferred HNB Search, 3rd Generation Partnership Project (3GPP), Mobile Competence Centre; 650, Route Des Lucioles F-06921, Sophia-Antipolis Cedex; France, No. Jeju; 20080812, Aug. 12, 2008, XP050319422.

"Universal Mobile Telecommunications System (UMTS); User Equipment (UE) procedures in idle mode and procedures for cell reselection in connected mode (3GPP TS 25.304 version 7.3.0 Release 7); ETSI TS 125 304" ETSI Standards, Lis, Sophia Antipolis Cedex, France, vol. 3-R2, No. V7.3.0. Oct. 1, 2007, XP014039982 ISSN: 0000-0001.

Taiwan Search Report—TW098126236—TIPO—Nov. 11, 2012.

\* cited by examiner

BATTERY EFFICIENT METHOD TO SEARCH FOR PREFERRED FEMTOCELL

CLAIM OF PRIORITY UNDER 35 U.S.C. §119

This application claims the benefit of and priority to commonly owned U.S. Provisional Patent Application No. 61/086,421, entitled "SYSTEM AND METHOD TO ENABLE SEARCHES FOR PREFERRED ACCESS POINT BASE STATIONS WITHIN A NETWORK," filed Aug. 5, 2008, the disclosure of which is hereby incorporated by reference herein.

REFERENCE TO CO-PENDING APPLICATIONS FOR PATENT

The present Application for Patent is related to co-pending U.S. patent application Ser. No. 12/409,368, entitled "POWER EFFICIENT SMALL BASE STATION SCANNING AND ACQUISITION" by Balasubramanian et al., filed on Mar. 23, 2009, assigned to the assignee hereof, and expressly incorporated by reference herein.

FIELD OF INVENTION

The exemplary and non-limiting aspects described herein relate generally to wireless communications systems, methods, computer program products and devices, and more specifically to techniques for power efficient techniques and components for discovering a limited range, limited access base station such as a femtocell.

BACKGROUND

Typical radio access cellular networks operate by way of various radio transmission devices, or base stations. These base stations provide wireless access to wireless mobile devices, such as cellular phones, to a core network of a cellular service provider. The base stations along with various data routing and control mechanisms (e.g., base station controllers, core and edge routers, and so on) facilitate remote communication for the mobile devices. As communication service providers expand base station coverage, more land areas can be covered by the radio access network. However, some areas can be difficult to provide reliable radio coverage, for various reasons such as population, high mobile traffic, interference with other transmitters, or materials that absorb base station transmission (e.g., dense, concrete and steel buildings, underground facilities, and the like).

Indoor cellular reception in particular has issues such as high interference, especially in higher floors subject to significant pilot signal noise pollution. Some venues have high capacity for people within a small area (e.g., shopping mall, airport terminal). These high density communication venues thus strain available capacity. It can be difficult to provide seamless integration of indoor cells with outdoor cells, not only managing interference but also in association, neighbor lists and call reselection procedures.

One solution to provide mobile communication support to areas where radio access is difficult, is a 'personal' base station, or femto Base Station (BS) (also termed, e.g., a home Node B or Femtocell). A BS can be a relatively small range device (compared with standard radio network base stations, such as a Node-B) that facilitates wireless communication over a licensed cellular radio band (as opposed to an unlicensed band, utilized by wireless local area network routers). In an exemplary aspect, the BS can be of any size to serve a large coverage area and amount of user equipment (e.g., cellular devices, mobile station, access terminals, handsets, etc.) within the coverage area. The BS can maintain a wireless link with cellular devices over such a radio band, in a similar manner as a Node-B base station. Consequently, a BS can provide small range cellular coverage for an area that does not receive a good signal from a radio access base station. Often, an individual consumer might utilize a BS in their home, an apartment building, an office building, and so on, for personal cellular access. In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the mobile operator's network via DSL router, IP communication or cable modem.

Conventionally, for a deployment model where femtocells are preferred because of a billing advantage or macro capacity off-load reason, it is often desirable that user equipment (UE) discovers and camps on its own femtocell when within its coverage area. More generally, UE can have a preference for a node based upon various considerations. For example, a service provider can offer better quality of service, additional services, etc. Thus, a preferred node can be a macro base station, femtocell.

By way of illustration, consider a conventional approach using standard non-HCS (Hierarchical Cell Structure) cell reselection rules. Periodically a neighbor search is performed, by all served mobile devices or UEs, depending upon the signal quality of a serving node. For example, a neighbor list search is triggered only when the signal strength of the current cell falls below certain thresholds e.g., a threshold $S_{INTRASEARCH}$ that triggers intra-frequency search and above a lower threshold $S_{INTERSEARCH}$ that triggers inter-frequency search). A femtocell or Home Node B (HNB) deployed in the midst of a strong macro cell would never be searched for and found, especially when the HNB is deployed on a different carrier frequency from the macro one that the mobile device or user equipment (UE) is camping on. Thus, the conventional approach does not provide for reliably discovering and camping on a preferred node.

Another known approach is using HCS (Hierarchical Cell Structure) cell reselection rules to make finding HNBs more likely, forcing all served mobile devices or UEs to search and measure high-priority base stations in all channel conditions and at all locations. A similar result can be achieved by elevating the non-HCS search thresholds resulting in a nearly continual search. Such continual searching can have significant impact on the standby time, reducing availability to the currently serving node and increasing power consumption. Moreover, many if not most of the served mobile devices or UEs may have no preferred node thus receiving no benefit for the increased power consumption.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for reliable and power-efficient discovery of a preferred node that employs a processor to execute computer executable instructions stored on a computer readable storage medium to implement following acts: Signal quality of a wireless channel transmitted by a serving node is measured. The signal quality is determined to be above a threshold, wherein being below the threshold indicates a need to prepare for cell reselection to a neighboring node. Measurements are periodically performed for neighboring nodes. Measures are performed for a preferred node at a slower repetition rate than the measurements for neighboring nodes in response to the signal quality being above the threshold.

In another aspect, a computer program product is provided for reliable and reliable and power-efficient discovery of a preferred node. In particular, at least one computer readable storage medium stores computer executable instructions that, when executed by at least one processor, implement components comprising: A first set of instructions causes a computer to measure signal quality of a wireless channel transmitted by a serving node. A second set of instructions causes the computer to determine the signal quality to be above a threshold, wherein being below the threshold indicates a need to prepare for cell reselection to a neighboring node. A third set of instructions causes the computer to periodically perform measurements for neighboring nodes. A fourth set of instructions causes the computer to periodically perform measurements for a preferred node at a slower repetition rate than the measurements for neighboring nodes in response to the signal quality being above the threshold.

In an additional aspect, an apparatus is provided for reliable and power-efficient discovery of a preferred node. At least one computer readable storage medium stores computer executable instructions that, when executed by at least one processor, implement components comprising: Means are provided for measuring signal quality of a wireless channel transmitted by a serving node. Means are provided for determining the signal quality to be above a threshold, wherein being below the threshold indicates a need to prepare for cell reselection to a neighboring node. Means are provided for periodically performing measurements for neighboring nodes. Means are provided for periodically performing measurements for a preferred node at a slower repetition rate than the measurements for neighboring nodes in response to the signal quality being above the threshold.

In a further aspect, an apparatus is provided for reliable and power-efficient discovery of a preferred node. A receiver measures signal quality of a wireless channel transmitted by a serving node. A computing platform determines the signal quality to be above a threshold, wherein being below the threshold indicates a need to prepare for cell reselection to a neighboring node, causes the receiver to periodically perform measurements for neighboring nodes, and causes the receiver to periodically perform measurements for a preferred node at a slower repetition rate than the measurements for neighboring nodes in response to the signal quality being above the threshold.

In yet one aspect, a method is provided for facilitating reliable and power-efficient discovery of a preferred node by employing a processor executing computer executable instructions stored on a computer readable storage medium to implement following acts: A mobile device is served as a serving node by transmitting and receiving wireless data packet communication. Discovery is facilitated by the mobile device of a preferred node by broadcasting a scrambling code used by the preferred node to the mobile device, wherein the mobile device periodically performs measurements for a preferred node at a slower repetition rate than the measurements for neighboring nodes in response to the signal quality being above the threshold.

In yet another aspect, a computer program product is provided for facilitating reliable and power-efficient discovery of a preferred node. In particular, at least one computer readable storage medium stores computer executable instructions that, when executed by the at least one processor, implement components comprising: A first set of instructions causes a computer to serve a mobile device as a serving node by transmitting and receiving wireless data packet communication. A second set of instructions causes the computer to facilitate discovery by the mobile device of a preferred node by broadcasting a scrambling code used by the preferred node to the mobile device, wherein the mobile device periodically performs measurements for a preferred node at a slower repetition rate than the measurements for neighboring nodes in response to the signal quality being above the threshold.

In yet an additional aspect, an apparatus is provided for facilitating reliable and power-efficient discovery of a preferred node. At least one computer readable storage medium stores computer executable instructions that, when executed by at least one processor, implement components comprising: Means are provided for serving a mobile device as a serving node by transmitting and receiving wireless data packet communication. Means are provided for facilitating discovery by the mobile device of a preferred node by broadcasting a scrambling code used by the preferred node to the mobile device, wherein the mobile device periodically performs measurements for a preferred node at a slower repetition rate than the measurements for neighboring nodes in response to the signal quality being above the threshold.

In yet a further aspect, an apparatus is provided for facilitating reliable and power-efficient discovery of a preferred node. A receiver receives wireless data packet communication service from a mobile device as a serving node. A computing platform accesses a scrambling code used by a preferred node. A transmitter broadcasts the scrambling code to the mobile device facilitating discovery by the mobile device of the preferred node, wherein the mobile device periodically performs measurements for a preferred node at a slower repetition rate than the measurements for neighboring nodes in response to the signal quality being above the threshold.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In accordance with one or more aspects and corresponding disclosure thereof, various aspects are described in connection with neighbor list search by a mobile device, access terminal or user equipment (UE) that ensures timely discovery of a preferred node (e.g., femtocell, home base node (HBN)) even in good channel condition), the mobile device performs neighboring cells search to look for the preferred node but at a slower rate than in normal intra-frequency and inter-frequency neighboring cellssearches. The criteria to search for a preferred node (e.g., femtocells) even in good channel conditions can ensure that searching and discovery occurs even if the preferred node is deployed on a different carrier frequency than where currently camped. Slower searching for the preferred node can reduce power consumption compared to conventional standard HCS and non-HCS cell reselection rules. Even slower rate searching or search hiatus can further improve power consumption by using location hints to determine a likelihood of discovery a preferred node.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
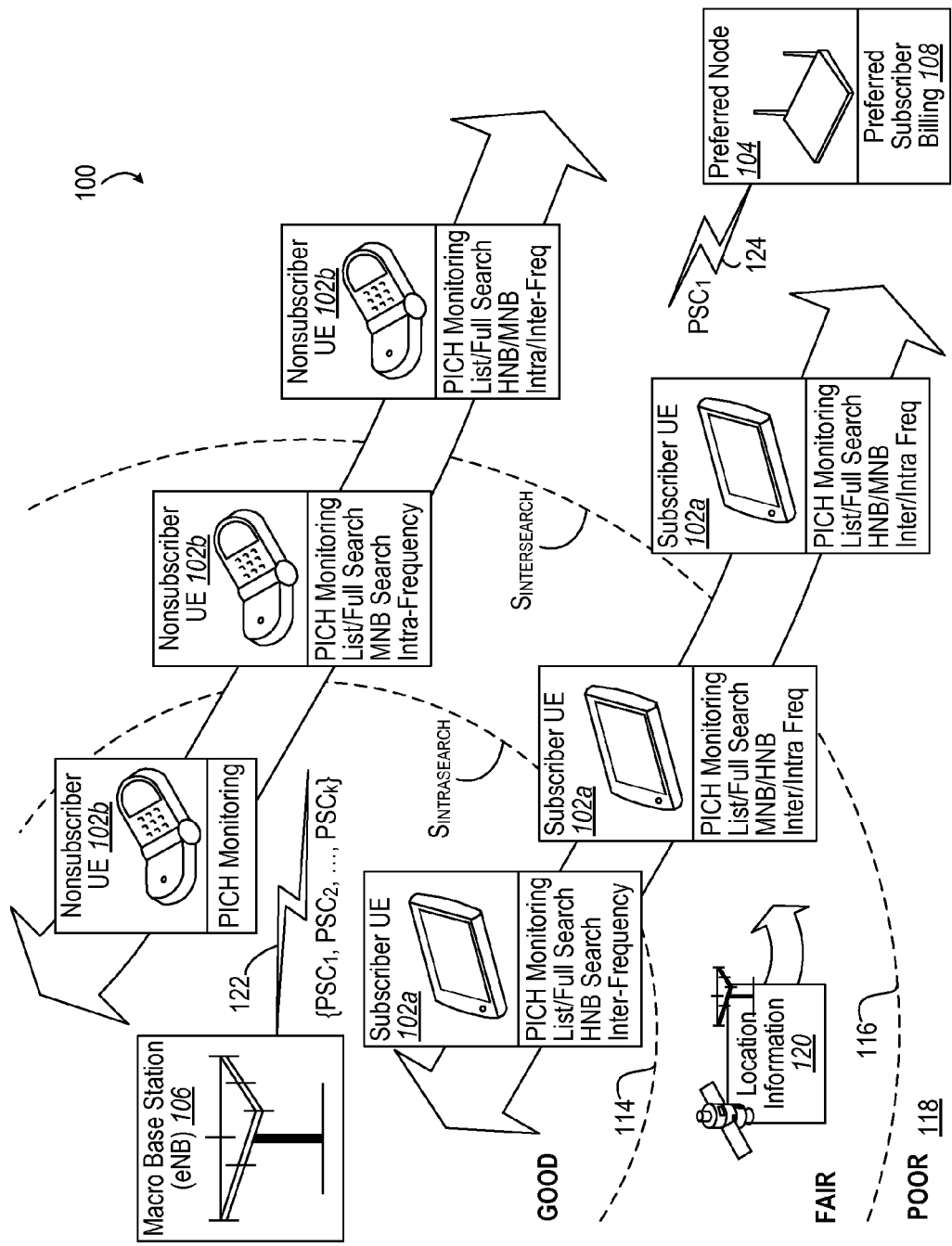
FIG. 1 depicts a block diagram of a communication system that enables a mobile device to selectively search for a preferred node in a background search.

In FIG. 1, a communication system 100 enables a mobile device, mobile station or user equipment (UE) 102a to selectively search for a preferred node (e.g., closed subscriber node, femtocell, sponsored macro cell, home base node, etc.) 104 in a manner likely to detect the preferred node 104 but in a battery efficient manner. In particular, when a serving node 106 provides a strong coverage area (e.g., "good" signal quality), the UE 102a continues to look for the preferred node 104 but at a reduced background rate than foreground measurement of serving/neighboring nodes 106 triggered to avoid interrupting a session due to a fading channel.

It should be appreciated with the benefit of the present disclosure that a subscription can indicate that a mobile device has sufficient authentication to access a closed subscriber base node (e.g., home base node). Alternatively, the subscription can refer to one of a plurality of access systems, each having a different billing rate, one or more of which is preferred as being more economical. Further, the subscription can pertain to a preference for a base node that has access to set of proprietary services or data not otherwise accessible.

In an exemplary communication system 100, a preferred node such as a femtocell 104—originally known as an Access Point Base Station—is a small cellular base station, typically designed for use in residential or small business environments. It connects to the service provider's network via broadband (e.g., Digital Subscriber Line (DSL) or cable). A femtocell allows service providers to extend service coverage indoors, especially where access would otherwise be limited or unavailable. The femtocell incorporates the functionality of a typical base station but extends it to allow a simpler, self contained deployment. An example is a femtocell containing a Node B, Radio Network Controller (RNC) and GPRS Support Node (SGSN) with Ethernet for backhaul. Although much attention is focused on 3GPP2 domain—1X and DO system, the concept is applicable to all standards, including GSM, CDMA2000, TD-SCDMA, UMTS and WiMAX solutions, as well as Long Term Evolution (LTE) and LTE-Advanced. It is further disclosed herein procedures that equally apply to finding femto cells across technologies, e.g., being in a 1X macro system and based on the location relative to the macro system looking for a UMTS femto box etc. Thus, in an illustrative aspect the UE 102a is a subscriber to a preferred node 104 such as a femtocell that provides an advantageous preferred subscribing billing system 108.

In an exemplary implementation, a nonsubscriber UE 102b performs foreground searching to maintain service in accordance with standard non-HCS (hierarchical cell structure) rules. To that end, when in a "good" channel condition 112 (e.g., signal quality $S_{QUAL}$ of the serving node being greater than a threshold for performing intra-frequency searching $S_{INTRASEARCH}$), the nonsubscriber UE 102b implements a good channel foreground searching limited to periodically measuring a serving cell's pilot strength and a paging channel indicator (i.e., Physical Indicator Channel (PICH) monitoring), based on boradcast parameters (e.g DRX cycle coefficient).

There is no need for measuring neighboring nodes because session interruption is unlikely and there is no preferred node to search for. Such a nonsubscriber UE 102b can be provisioned for background searching but disables such background searching in response to not having a defined preferred node.

Idle DRX/PICH monitoring is monitoring paging channel indicator, measures a pilot strength of the serving cell, and is performed each DRX cycle When the nonsubscriber UE 102b determines that it is in a "fair" channel condition 114 (e.g., signal quality $S_{QUAL}$ of the serving node being less than $S_{INTRASEARCH}$ but greater than a threshold for performing inter-frequency searching $S_{IN-TERSEARCH}$), the foreground searching expands from PICH monitoring to include searching of neighboring nodes, in particular for macro base nodes (MNB). Thereby, the UE 102b is capable of maintaining service should a cell reselection be required.

When the nonsubscriber UE 102b determines that it is in a "poor" channel condition 116 (e.g., $S_{QUAL} < S_{INTERSEARCH}$), the foreground searching expands from PICH monitoring and intra-frequency neighbor searching for MNBs to include inter-frequency searching and searching for femtocells as well.

Similarly, the exemplary subscriber UE 102a performs foreground searching to preserve service; however, the subscriber UE 102a also successfully searches for and detects the preferred node 104. To that end, when in a good channel condition 112, the subscriber UE 102a performs PICH monitoring and background searching for a preferred node. When the subscriber UE 102a determines itself to be in a fair channel condition 114, the subscriber 102a also performs intra-frequency searching for another MNB in case a cell reselection becomes necessary. When the subscriber UE 102a determines itself to be in a poor channel condition 116, the subscriber UE 102a also performs inter-frequency searching for MNBs, HNBs (preferred or not) since call reselection is necessary or imminent.

In one aspect, location information 120 (e.g., Global Positioning System (GPS), macro base node provided, etc.) can be used to further adjust the period for performing neighboring cell searching. For example, background searching can be discontinued beyond a threshold proximity where access for a preferred node 104 is improbable. By discontinuing the background search, additional resources are freed up and power savings are achieved. As another example, background searching can be performed at slower rate within a proximity range where successful discovery and access is estimated as being unlikely or problematic. In an exemplary implementation, location hints can be obtained as described in the above-identified related patent application that has been incorporated by reference.

In another aspect, foreground or background searching is facilitated by a network entity (e.g., macro base station 106, preferred node 104) that provides a spreading code that would otherwise have to be determined to detect and measure synchronization channel(s) necessary to acquiring a neighboring node. In one example, the macro base station 106 maintains a neighbor list of those bordering macro cells or femtocells that are within the coverage area. A broadcast 122 of the neighbor list can disseminate primary scrambling codes (PSCs) for these maintained nodes. The subscriber node 102a can recognize the preferred node 104 from the neighbor list, triggering background searching. Alternatively or in addition, the subscriber node 102a can expedite foreground searching (e.g., foregoing searching). In another aspect, the preferred node 104 can broadcast its primary scrambling code (PSC) 124. The subscriber UE 102a can use detection of this broadcast to trigger background searching or to expedite measurement of synchronization channel(s) for the preferred node.

Figure 2A:
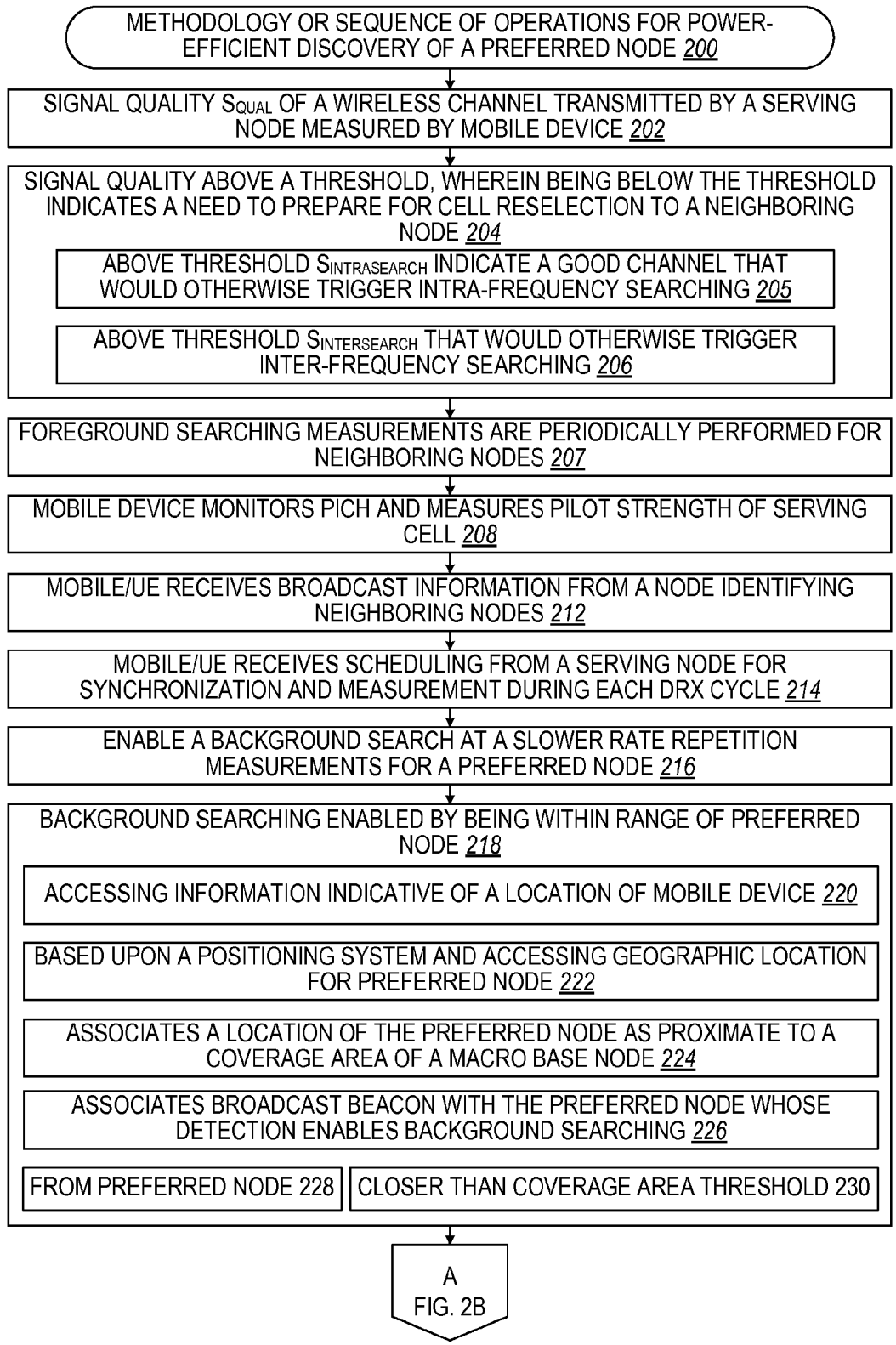
FIGS. 2A-2B depicts a flow diagram for a methodology or sequence of operations for reliable and power-efficient discovery of a preferred node.
Figure 2B:
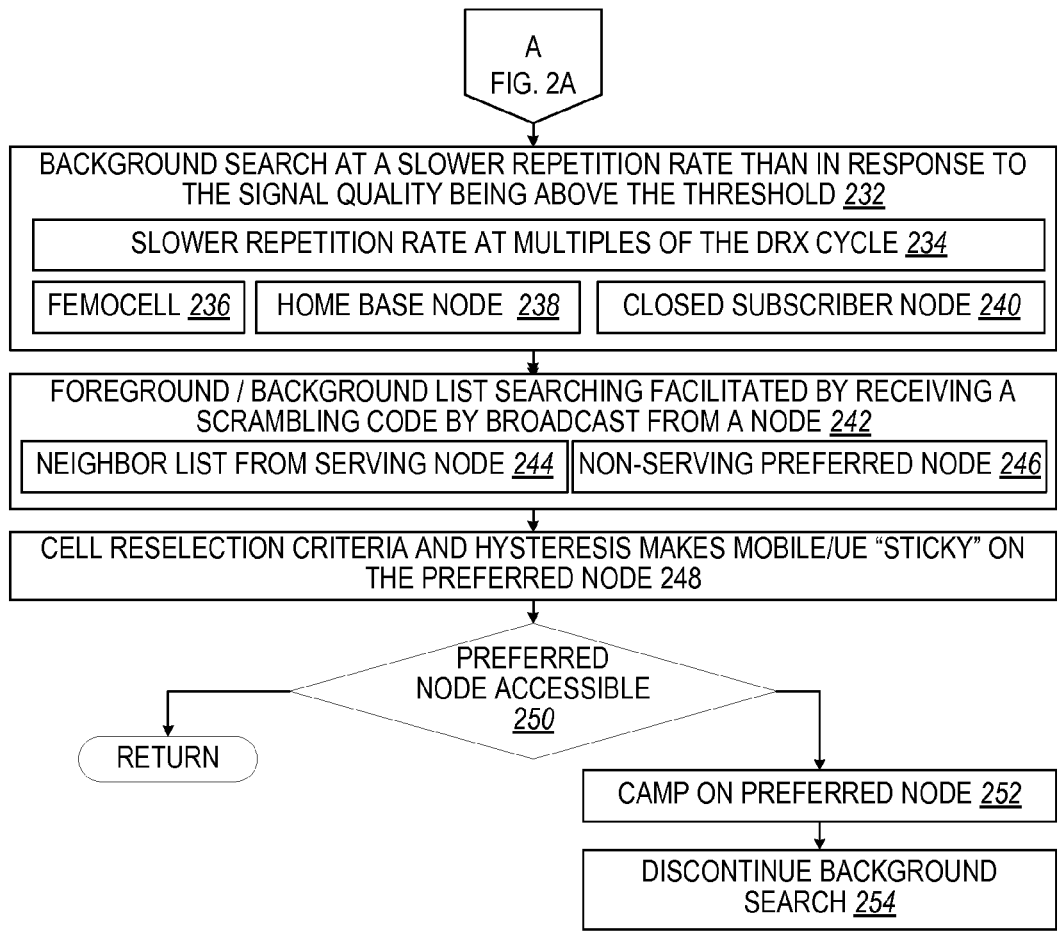

In FIGS. 2A-2B, a methodology or sequence of operations 200 is provided for reliable and power-efficient discovery of a preferred node. Signal quality $S_{QUAL}$ of a wireless channel transmitted by a serving node is measured by a mobile device, access terminal or user equipment (UE) (block 202). The signal quality is determined to be above a threshold, wherein being below the threshold indicates a need to prepare for cell reselection to a neighboring node (block 204). For example, the signal quality is determined to be above a threshold $S_{IN-TRASEARCH}$ indicate a good channel above the threshold that would otherwise trigger intra-frequency searching (block 205). Alternatively or in addition, the signal quality is determined to indicate a fair channel above the threshold $S_{IN-TERSEARCH}$ that would otherwise trigger inter-frequency searching (block 206).

Measurements are periodically performed for neighboring nodes (block 207). In an illustrative aspect, the mobile device monitors Physical Indicator Channel (PICH) and measures pilot strength of the serving cell (block 208). Alternatively or in addition, the mobile device/UE receives broadcast information from a node identifying neighboring nodes that facilitates detection and measuring (block 212). In an exemplary aspect, the mobile device/UE receives scheduling from a serving node for synchronization and measurement during each discontinuous reception (DRX) cycle (block 214).

Advantageously, the mobile device/UE can enable a background search at a slower rate repetition measurements for a preferred node in response to a determination that user equipment has a predefined a preferred node (block 216).

Alternatively or in addition, background searching can be enabled by determining to be within range of the preferred node (block 218). This determination is made by accessing information indicative of a location of mobile device (e.g., user equipment) (block 220). For example, the mobile device/UE can provide for determining location based upon a positioning system and accessing geographic location for the preferred node (block 222). As another example, the mobile device/UE can provide for associating a location of the preferred node as proximate to a coverage area of a macro base node (block 224). As an additional example, the mobile device/UE can provide for associating a broadcast beacon with the preferred node whose detection enables background searching (block 226). For example, the mobile device/UE can receive self-identifying broadcast information from the preferred node (block 228). Thereby one or more of the preceding indications, the mobile device/UE is capable of determining proximity to the preferred node (block 230) and thus initiating slower repetition rate measurements for the preferred node in response to the proximity being closer than a coverage area threshold.

Thus, the mobile device/UE is provisioned for periodically performing measurements for a preferred node at a slower repetition rate than the measurements for neighboring nodes in response to the signal quality being above the threshold (block 232). For example, the mobile device/UE can be performing slower repetition rate at multiples of the DRX cycle (block 234). The preferred node can be a femtocell (block 236), home base node (block 238), or a closed subscriber node (block 240).

The foreground neighbor searching each DRX cycle or background searching each certain multiple of DRX cycles can be facilitated by receiving a scrambling code by broadcast for demodulating a synchronization signal from a node so that periodic measurements for the preferred node can be performed using the scrambling code (block 242). For example, the mobile device/UE can receive a plurality of scrambling codes as part of a neighbor list for respective neighboring nodes from a serving node (block 244). Alternatively or in addition, the mobile device/UE can receive the scrambling code from a non-serving preferred node that transmits using the scrambling code (block 246).

Call reselection criteria and hysteresis is advantageously set to make the mobile device/UE "Sticky" on the preferred node (block 248). Once detected as accessible (block 250), the mobile device/UE camps on the preferred node (block 252) and can then discontinue performing background searching (block 254).

It should be appreciated that the case of having one preferred node is described for clarity. Each mobile device/UE can have a plurality of preferred nodes and perhaps a priority ranking among their predefined, preferred nodes. Further, some mobile devices/UEs can share a preferred node or have different preferred nodes.

Figure 3:
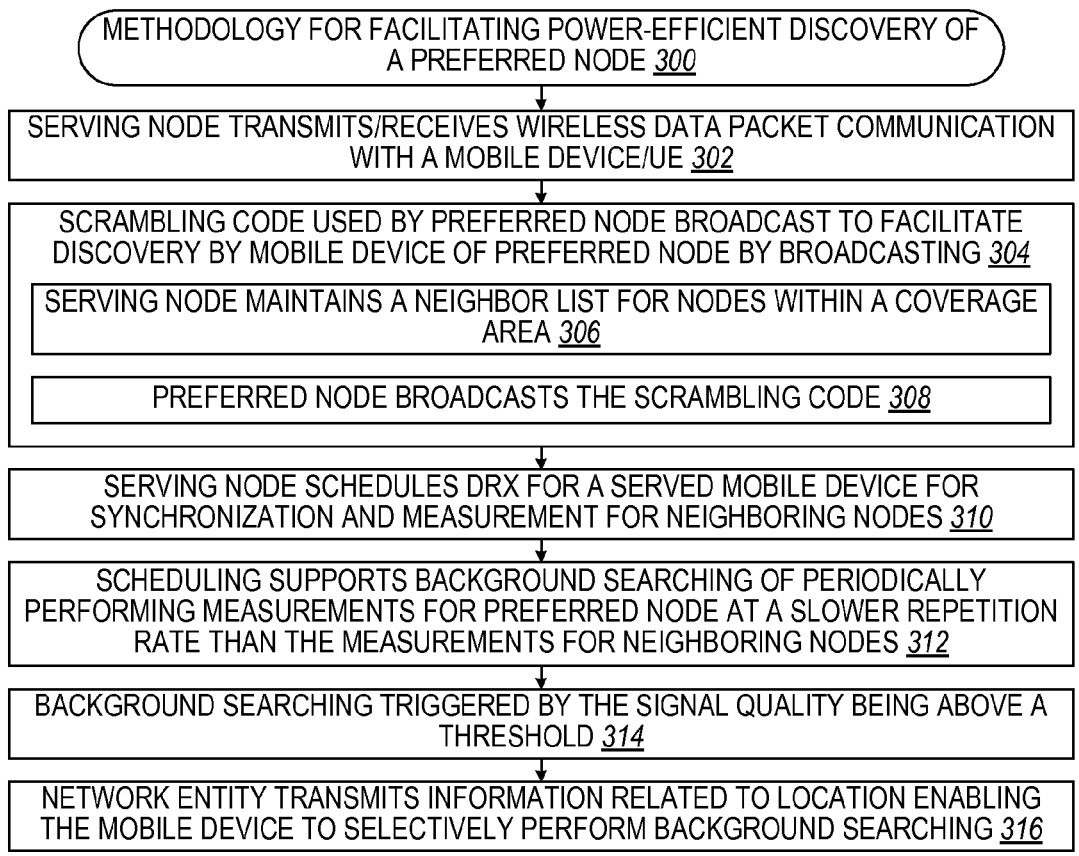
FIG. 3 depicts a flow diagram for a methodology or sequence of operations for facilitating reliable and power-efficient discovery of a preferred node.
Figure 4:
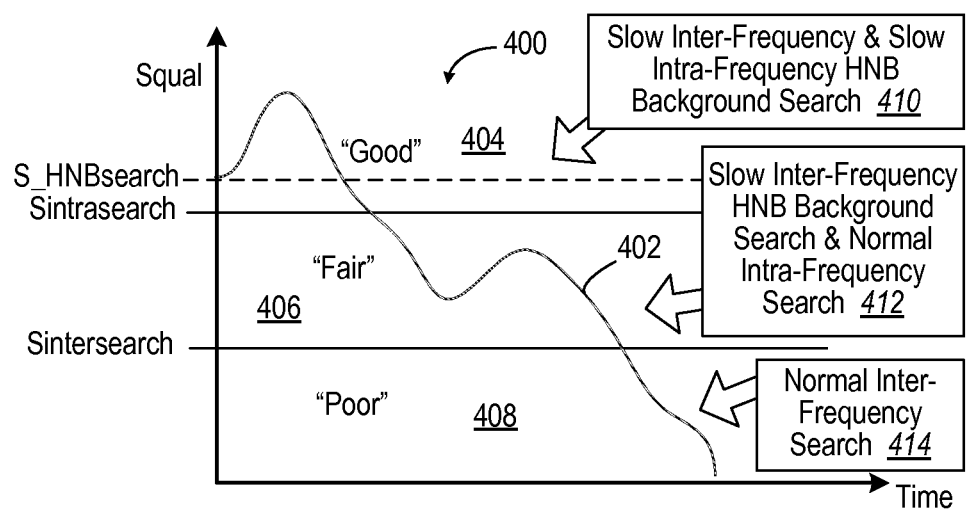
FIG. 4 depicts a graphical plot illustrating a methodology for power efficient discovery of a preferred node with background search that implements a hierarchical cell structure (HCS).
Figure 5:
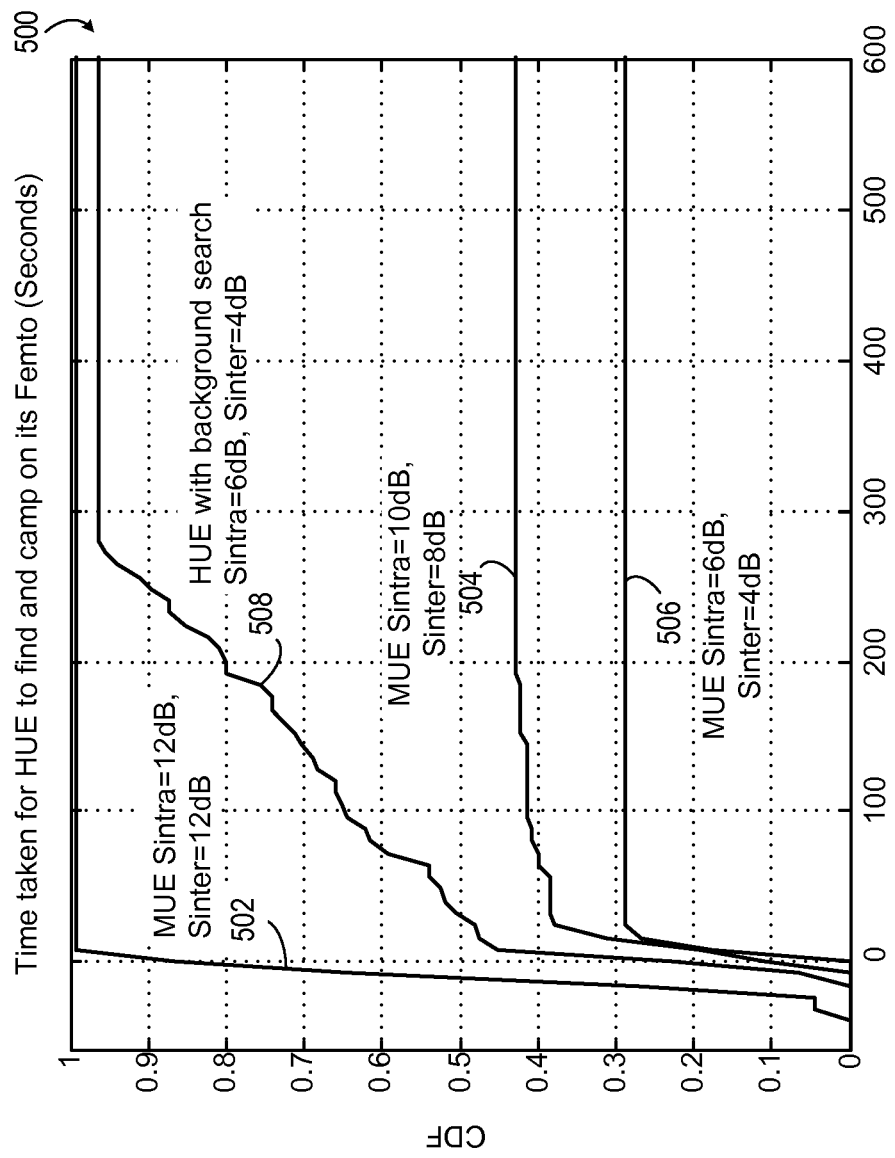
FIG. 5 depicts a graphical plot of a cumulative distribution function (CDF) of time taken for home base node or preferred node discovery.
Figure 6:
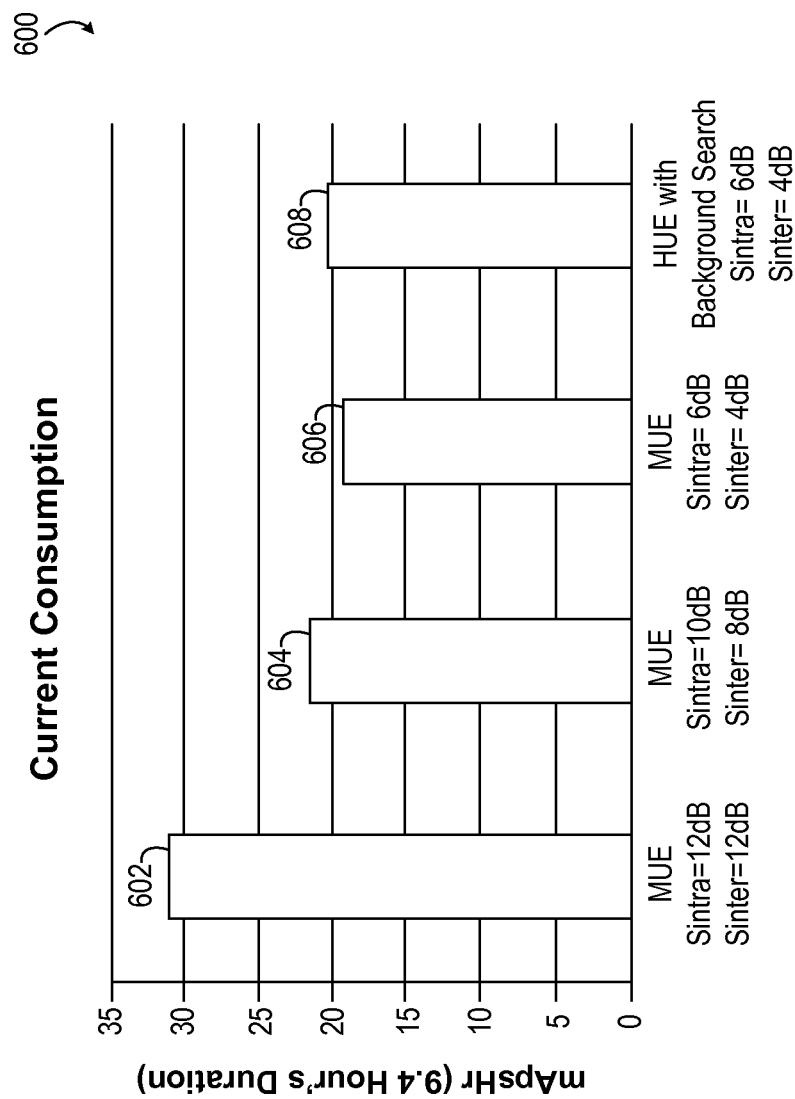
FIG. 6 depicts a bar graph of current consumption for foreground and background searches.

In FIG. 3, a methodology or sequence of operations 300 is provided for facilitating reliable and power-efficient discovery of a preferred node. A node serves a mobile device as a serving node by transmitting and receiving wireless data packet communication (block 302). A scrambling code used by the preferred node to the mobile device is broadcast to facilitate discovery by the mobile device of the preferred node by broadcasting, wherein the mobile device periodically performs measurements for a preferred node at a slower repetition rate than the measurements for neighboring nodes in response to the signal quality being above the threshold (block 304).

In one example, the serving node maintains a neighbor list for nodes within a coverage area, wherein the preferred node is one of the nodes (block 306). The serving node broadcasts a neighbor list containing scrambling codes for the nodes within the coverage area (block 306).

Alternatively or in addition, the preferred node broadcasts the scrambling code by the preferred node for facilitating discovery by the mobile device (block 308).

In one aspect, the serving node schedules a served mobile device for a discontinuous reception (DRX) cycle for performing synchronization and measurement for transmissions from the serving node and neighboring nodes (block 310). Advantageously, the scheduling supports background searching of periodically performing measurements for the preferred node at a slower repetition rate than the measurements for neighboring nodes (block 312). The background searching can be triggered by the signal quality being above a threshold (block 314).

In addition, a network entity such as the serving node or the preferred node can transmit information related to location enabling the mobile device to selectively perform measurements for the preferred node at the slower repetition rate (block 316).

Figure 7:
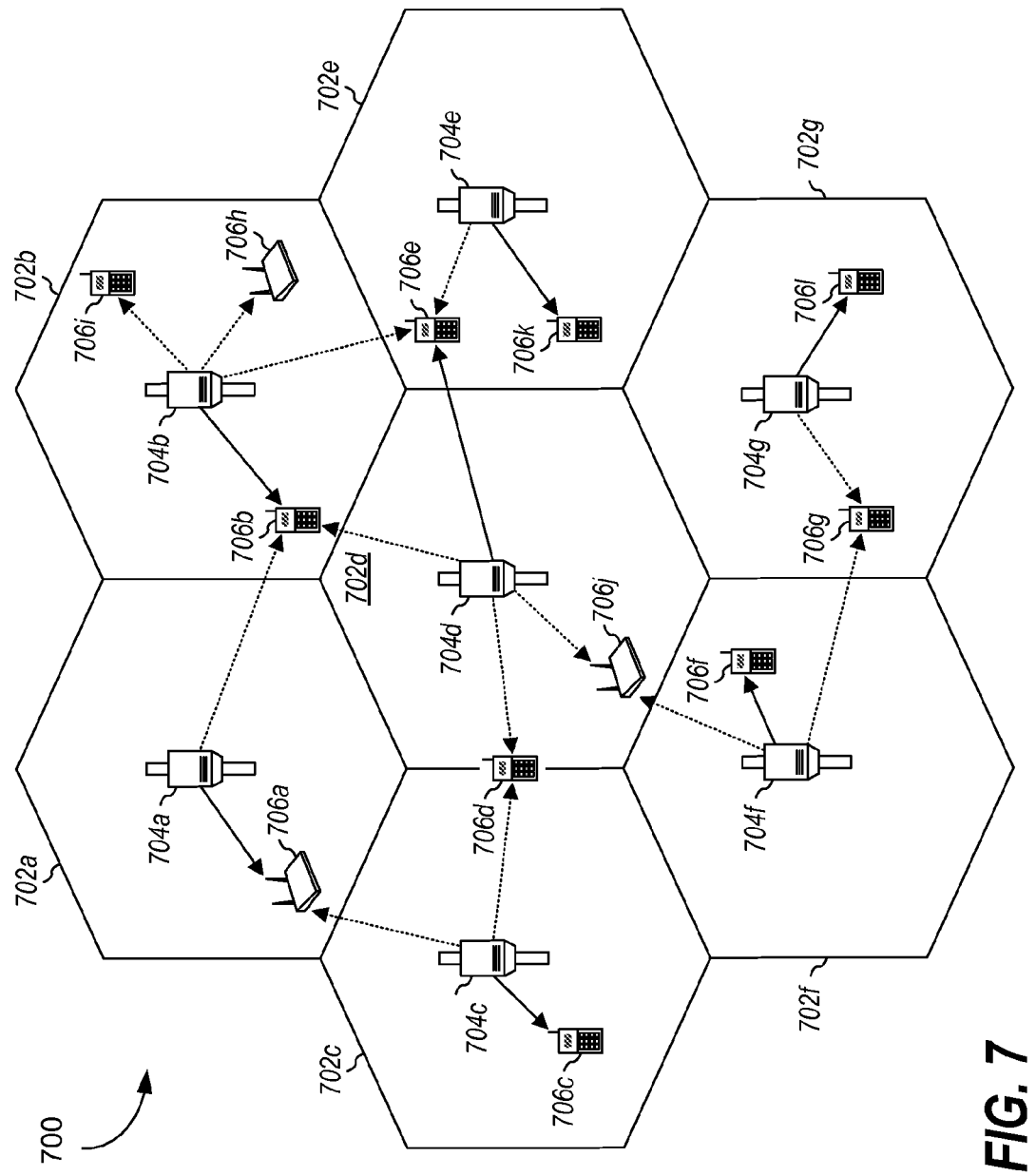
FIG. 7 depicts a block diagram of an exemplary wireless communication system for discovery neighboring and preferred nodes.

FIG. 7 illustrates an exemplary wireless communication system 700 configured to support a number of users, in which various disclosed embodiments and aspects may be implemented. As shown in FIG. 7, by way of example, system 700 provides communication for multiple cells 702, such as, for example, macro cells 702a-702g, with each cell being serviced by a corresponding access point (AP) 704 (such as APs 704a-104g), also known as access nodes (ANs). Each cell may be further divided into one or more sectors. Various access terminals (ATs) 706, including ATs 706a-706k, also known interchangeably as user equipment (UE), are dispersed throughout the system. Each AT 706 may communicate with one or more APs 704 on a forward link (FL) and/or a reverse link (RL) at a given moment, depending upon whether the AT is active and whether it is in soft handoff, for example. The wireless communication system 700 may provide service over a large geographic region, for example, macro cells 702a-702g may cover a few blocks in a neighborhood.

Figure 8:
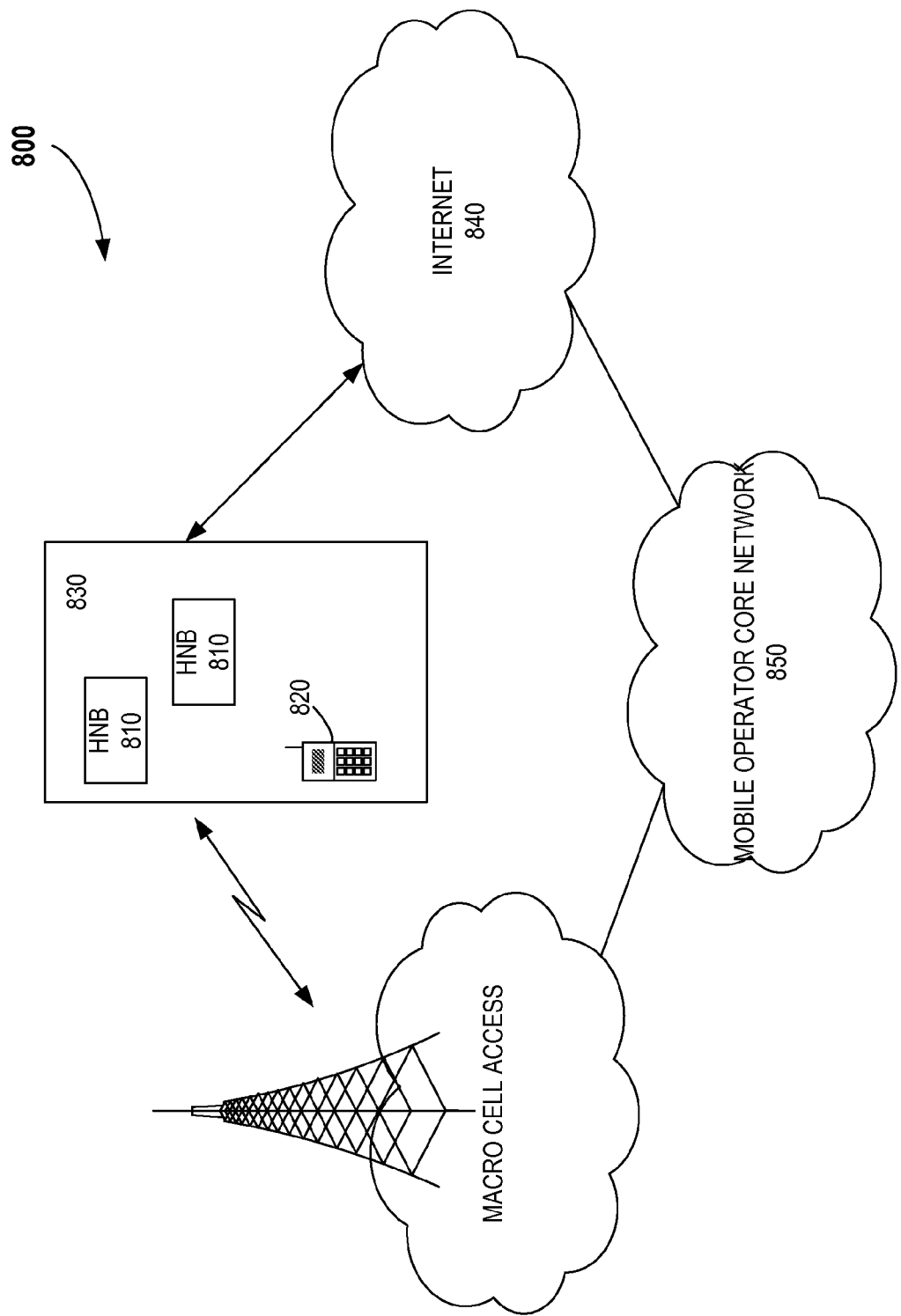
FIG. 8 depicts a block diagram of an exemplary communication system to enable mobile devices to access base nodes within a network environment.

FIG. 8 illustrates an exemplary communication system to enable deployment of access point base stations within a network environment. As shown in FIG. 8, the system 800 includes multiple access point base stations or Home Node B units (HNBs), such as, for example, HNBs 810, each being installed in a corresponding small scale network environment, such as, for example, in one or more user residences 830, and being configured to serve associated, as well as alien, user equipment (UE) 820. Each HNB 810 is further coupled to the Internet 840 and a mobile operator core network 850 via a DSL router (not shown) or, alternatively, a cable modem (not shown), a wireless link, or other Internet connectivity means.

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 810 subscribes to mobile service, such as, for example, 3G mobile service, offered through the mobile operator core network 850, and the UE 820 is capable to operate both in macro cellular environment and in residential small scale network environment.

Figure 9:
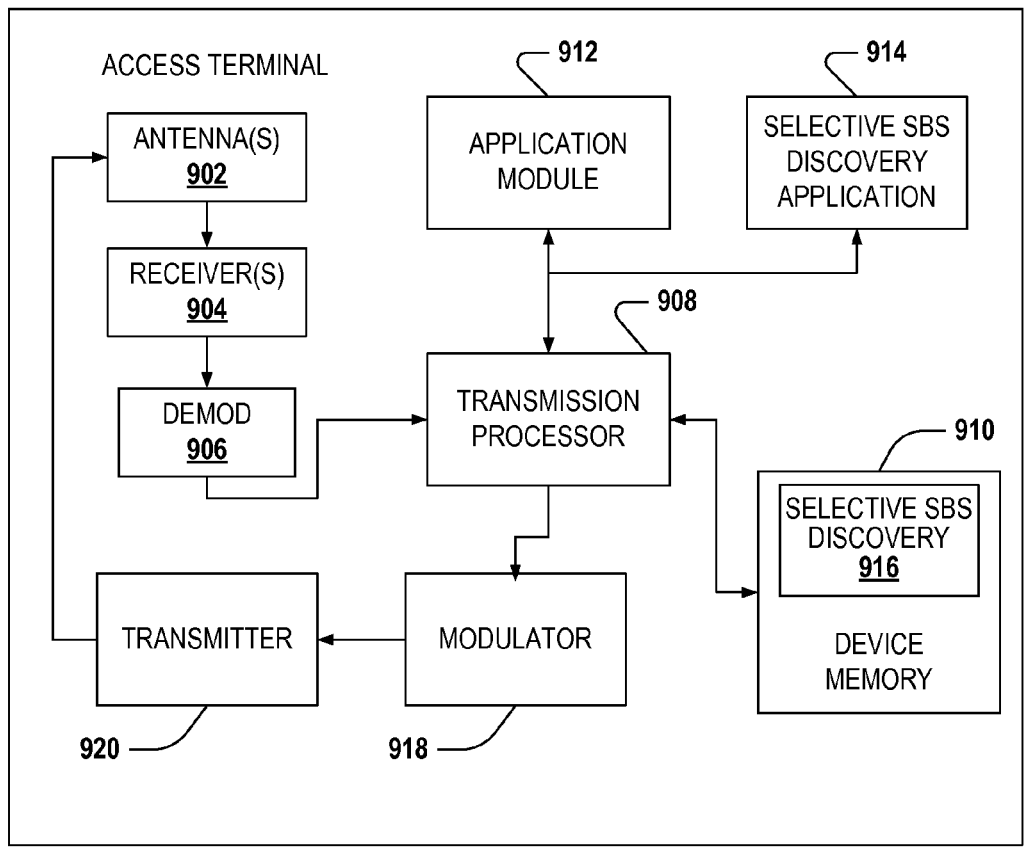
FIG. 9 depicts a block diagram of a mobile device that can interface with macro and femto base nodes.

FIG. 9 illustrates a sample mobile device that can interface with a femto base station (fBS) network for cellular access in accordance with one or more aspects. Mobile device 900 includes at least one antenna 902 (e.g., a transmission receiver or group of such receivers comprising an input interface) that receives a signal (e.g., containing information related to a data link between a first fBS and mobile device 900) and at least one receiver 904 that performs typical actions (e.g., filters, amplifies, down-converts, etc.) on the received signal. Specifically, antenna(s) 902 can receive information from one or more cellular base stations or fBSs (not depicted), as described herein, to participate in a communication link with such devices. For example, the antenna(s) 902 can receive identifying information such as geographic location from an fBS or a cellular network component.

Antenna 902 and receiver 904 can also be connected to a demodulator 906 that can demodulate received symbols and provide them to a transmission processor 908 for evaluation. Transmission processor 908 can be a processor dedicated to analyzing information received by antenna(s) 902 and/or generating information for transmission by a transmitter 920. Additionally, transmission processor 908 can control one or more components of mobile device 900, and/or analyze information received by antenna(s) 902, generate information for transmission by transmitter 920, and control one or more components of mobile device 900. Additionally, transmission processor 908 can access an application module 912 stored in device memory 910 to execute instructions for determining a proximity trigger and scanning for a preferred small base station (e.g., femto base station). The device memory 910 can retain stored instructions and can be used for storing data. In particular, mobile device 900 can additionally comprise device memory 910 that is operatively coupled to transmission processor 908 and that can store data to be transmitted, received, and the like. Furthermore, memory 910 can store application modules for mobile device 900. Selective SBS Discovery application module 912 and application 914 can be two such modules stored within device memory 910 (see below).

It will be appreciated that a data store (e.g., device memory 910) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory (e.g., device memory 910) of the subject systems and methods is intended to comprise, without being limited to, these and any other suitable types of memory.

Application module 912 can be stored in device memory 908 and configured to generate instructions for an fBS to report its geographic location or a beacon and to perform provisioning of a selective SDS discovery database. For instance, the application module 912 can access data stores in memory 908 and identify an fBS affiliated with mobile device 900. Also stored in device memory 910 is a selective SBS discovery application 914. Mobile device 900 still further comprises a modulator 918 and a transmitter 920 that transmits a signal (e.g., including a transmission data packet) for instance, to a base station (e.g., fBS or group of fBSs), an access point, another mobile device, a remote agent, etc. Although depicted as being separate from the transmission processor 908, it is to be appreciated that application module 912 and transmission mapping application 914 can be part of processor 908 or a number of processors (not shown), stored in cache memory, for instance.

Figure 10:
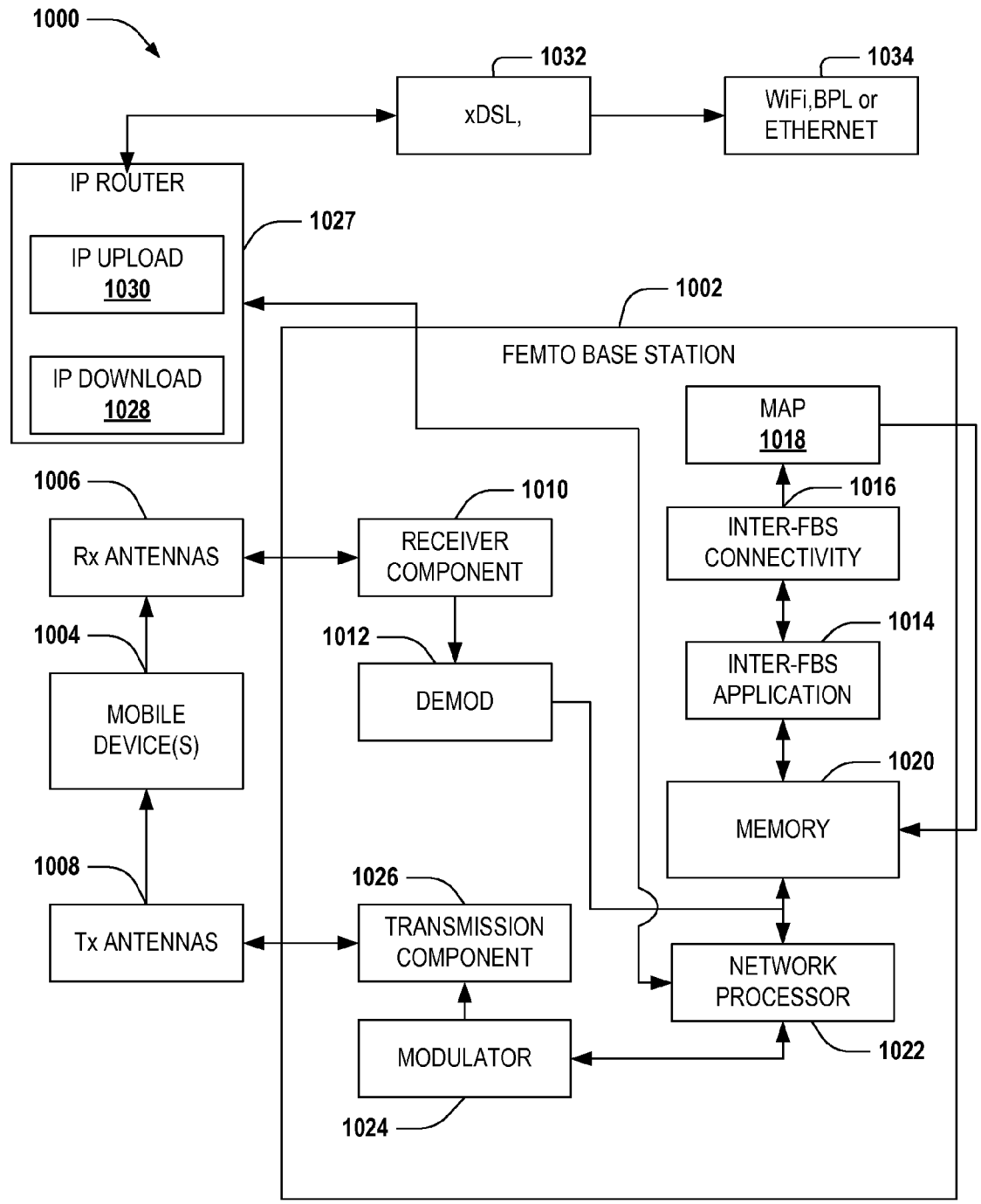
FIG. 10 depicts a block diagram of a system that can interface mobile devices with a cellular network via a femto cell.

FIG. 10 is an illustration of a system 1000 that can interface mobile devices 1004 with a cellular network (not depicted) by way of a network of fBS devices. System 1000 includes an fBS 1002 (e.g., access point, etc.) with a receiver component 1010 that receives signal(s) from mobile device(s) 1004, or from other fBS devices (not depicted) through a plurality of receive antennas 1006. fBS 1002 also includes a transmission component 1026 that transmits to the mobile device(s) 1004 (or other fBS devices) through one or more transmit antennas 1008. Receiver component 1010 can receive information from receive antennas 1006 and can further comprise a signal recipient (not shown) that receives uplink data transmitted by the mobile devices. It should be appreciated that receiver component 1010 and transmission component 1026 can both include WLAN, BPL, Ethernet, UMTS TDD, or WLAN over UMTS TDD spectra communication capabilities in order to interact with mobile devices or with other fBS devices.

Receiver component 1010 is operatively associated with a demodulator 1012 that demodulates received information. Demodulated symbols are analyzed by a network processor 1022 that can generate additional signals (e.g., in the form of transmission and/or routing instructions) modulated by modulator 1024 and transmitted by transmission component 1026. Further, network processor 1022 can be coupled to a memory 1020. Memory 1020 stores information pertinent to effectuating wired and/or wireless communication, application modules 1014, 1016 for maintaining an fBS network and routing information between fBS devices and/or with connected mobile devices, and/or any other suitable information related to performing the various actions and functions set forth herein (see below).

Network processor 1022 can route at least a portion of traffic associated with a communication link between fBS 1002 and a mobile device 1004 to a neighboring fBS (not depicted) for transfer to a cellular network (e.g., by way of a direct connection to the cellular network, or by way of the Internet). Furthermore, network processor 1022 is configured to direct traffic affiliated with the fBS 1002 (e.g., generated by a predetermined mobile device or group of mobile devices, for instance) directly to the cellular network by way of an IP upload link 1030 (e.g., DSL connection, such as ADSL, VDSL, HDSL etc., cable IP connection, BPL connection). In addition, data can be received from the cellular network via an IP download link 1028 (e.g., DSL, cable, BPL) and directed to a mobile device 1004 affiliated with the fBS 1002. In addition to the foregoing, receiver component 1010 and transmission component 1026 can receive and transmit, respectively, various information to/from a cellular network (e.g., via IP upload 1030 and/or IP download 1028) or to/from other fBS devices of the fBS network by way of an IP router 1027 that communicates over unlicensed frequencies or wired connections (e.g., WLAN router, LAN router, or the like).

Figure 11:
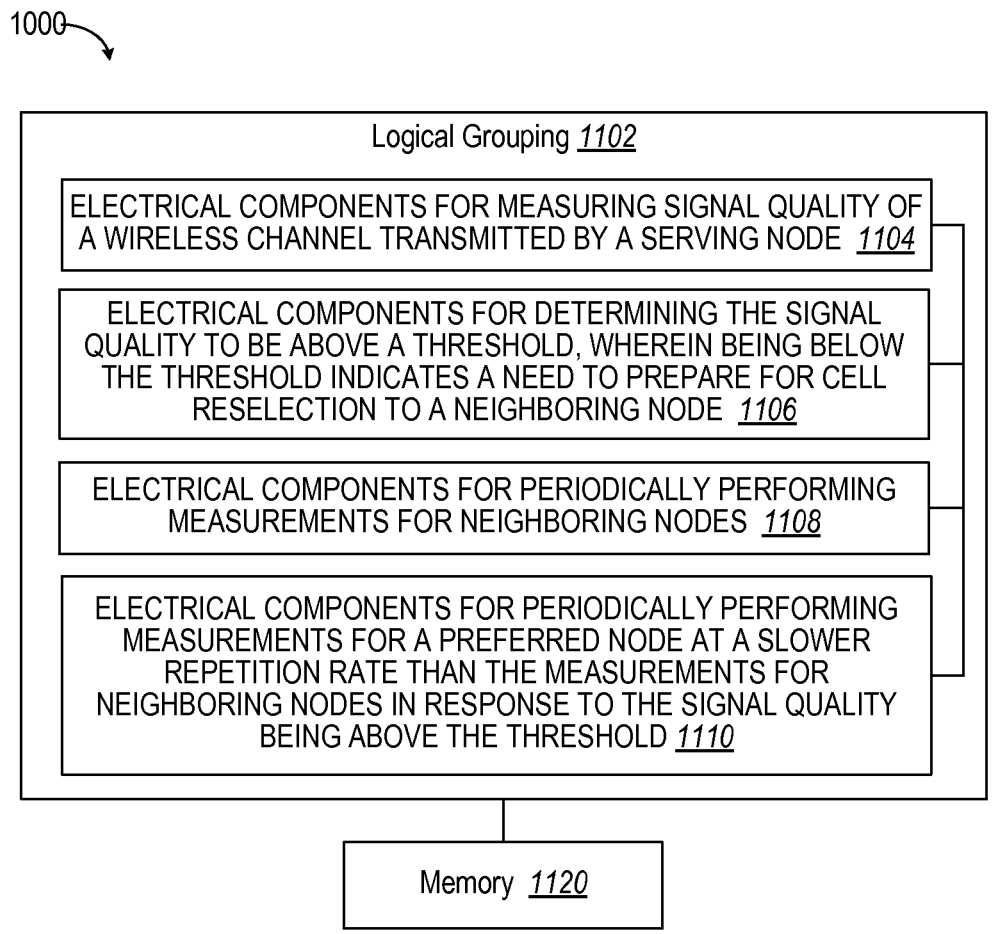
FIG. 11 depicts a block diagram of a system, such as mobile user equipment, comprised of logical groupings of electrical components for reliable and reliable and power-efficient discovery of a preferred node.

With reference to FIG. 11, illustrated is a system 1100 for reliable and power-efficient discovery of a preferred node. For example, system 1100 can reside at least partially within user equipment (UE). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for measuring signal quality of a wireless channel transmitted by a serving node 1104. Moreover, logical grouping 1102 can include an electrical component for determining the signal quality to be above a threshold, wherein being below the threshold indicates a need to prepare for call reselection to a neighboring node 1106. Further, logical grouping 1102 can include an electrical component for periodically performing measurements for neighboring nodes 1108. In addition, logical grouping 1102 can include an electrical component for periodically performing measurements for a preferred node at a slower repetition rate than the measurements for neighboring nodes in response to the signal quality being above the threshold 1110. Additionally, system 1100 can include a memory 1120 that retains instructions for executing functions associated with electrical components 1104-1110. While shown as being external to memory 1120, it is to be understood that one or more of electrical components 1104-1110 can exist within memory 1120.

Figure 12:
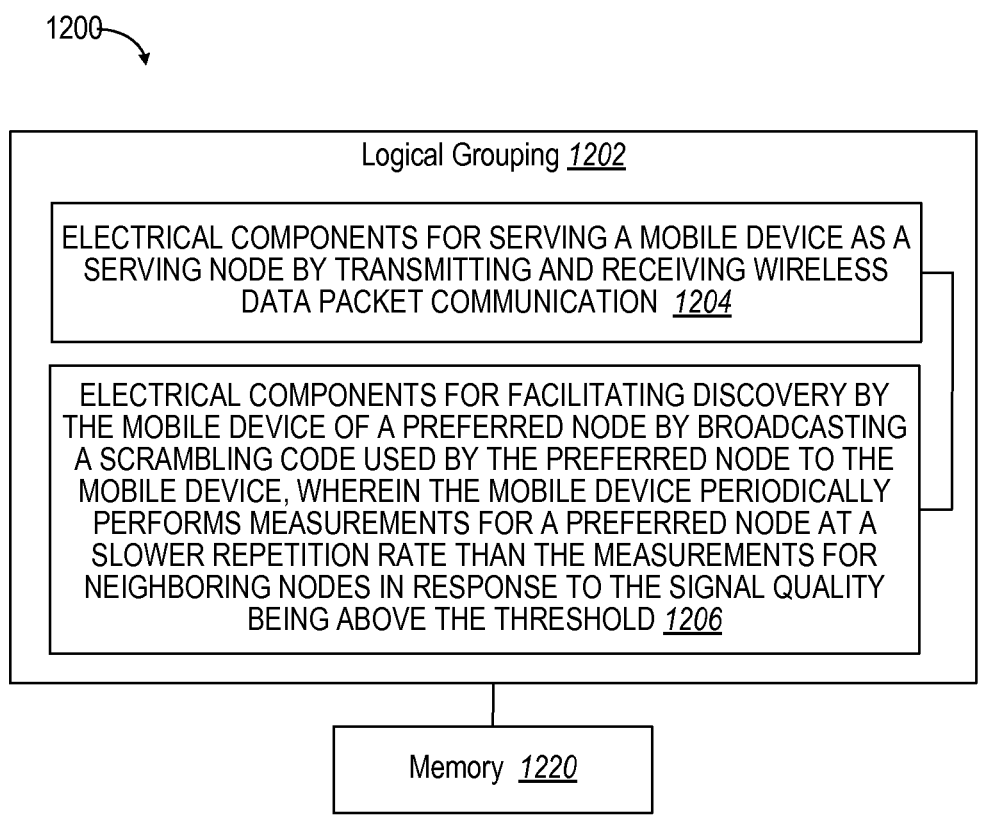
FIG. 12 depicts a block diagram of a system, such as base node, comprised of logical groupings of electrical components for reliable and power-efficient discovery of a preferred node.

With reference to FIG. 12, illustrated is a system 1200 for facilitating reliable and power-efficient discovery of a preferred node. For example, system 1200 can reside at least partially within a network entity for radio access (e.g., macro base station, femtocell, home base node, etc.). It is to be appreciated that system 1200 is represented as including functional blocks, which can be functional blocks that represent functions implemented by a computing platform, processor, software, or combination thereof (e.g., firmware). System 1200 includes a logical grouping 1202 of electrical components that can act in conjunction. For instance, logical grouping 1202 can include an electrical component for measuring signal quality of a wireless channel transmitted by a serving node 1204. Moreover, logical grouping 1202 can include an electrical component for determining the signal quality to be above a threshold, wherein being below the threshold indicates a need to prepare for call reselection to a neighboring node 1206. Further, logical grouping 1202 can include an electrical component for periodically performing measurements for neighboring nodes 1208. In addition, logical grouping 1202 can include an electrical component for periodically performing measurements for a preferred node at a slower repetition rate than the measurements for neighboring nodes in response to the signal quality being above the threshold 1210. Additionally, system 1200 can include a memory 1220 that retains instructions for executing functions associated with electrical components 1204-1210. While shown as being external to memory 1220, it is to be understood that one or more of electrical components 1204-1210 can exist within memory 1220.

Figure 13:
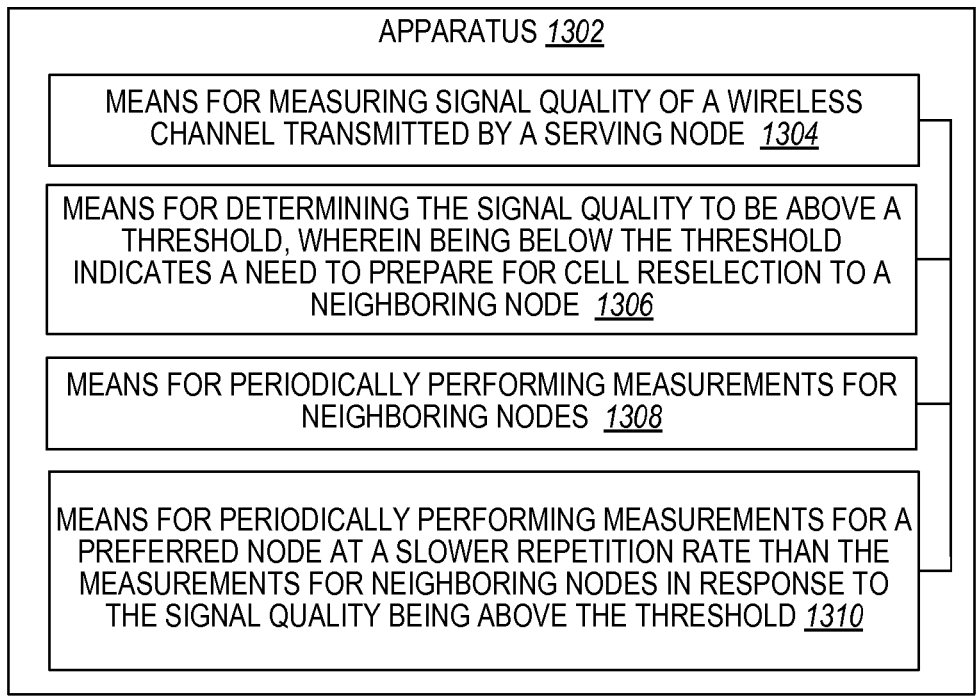
FIG. 13 depicts a block diagram of an apparatus having means for reliable and power-efficient discovery of a preferred node.

In FIG. 13, an apparatus 1302 is provided for reliable and power-efficient discovery of a preferred node. Means 1304 are provided for measuring signal quality of a wireless channel transmitted by a serving node. Means 1306 are provided for determining the signal quality to be above a threshold, wherein being below the threshold indicates a need to prepare for call reselection to a neighboring node. Means 1308 are provided for periodically performing measurements for neighboring nodes. Means 1310 are provided for periodically performing measurements for a preferred node at a slower repetition rate than the measurements for neighboring nodes in response to the signal quality being above the threshold.

Figure 14:
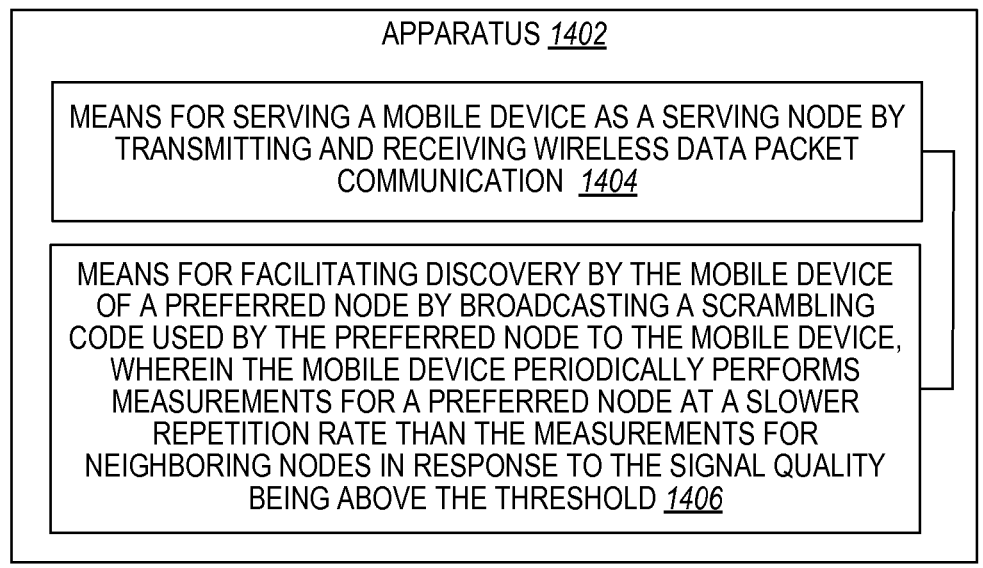
FIG. 14 depicts a block diagram of an apparatus having means for facilitating reliable and power-efficient discovery of a preferred node.

In FIG. 14, an apparatus 1402 is provided for facilitating reliable and power-efficient discovery of a preferred node. Means 1404 are provided for serving a mobile device as a serving node by transmitting and receiving wireless data packet communication. Means 1404 are provided for facilitating discovery by the mobile device of a preferred node by broadcasting a scrambling code used by the preferred node to the mobile device, wherein the mobile device periodically performs measurements for a preferred node at a slower repetition rate than the measurements for neighboring nodes in response to the signal quality being above the threshold.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for reliable and power-efficient discovery of a preferred node, comprising:
    measuring signal quality of a wireless channel transmitted by a serving node;
    determining the signal quality to be above a threshold, wherein being below the threshold indicates a need to prepare for cell reselection to another neighboring node;
    periodically performing measurements for one or more neighboring nodes; and
    periodically performing measurements for the preferred node, distinct from and higher priority than the serving node and the one or more neighboring nodes, at a slower repetition rate than the measurements for the one or more neighboring nodes in response to the signal quality being above the threshold.

2. The method of claim 1, further comprising determining the signal quality to indicate a good channel above the threshold that would otherwise trigger intra-frequency searching.

3. The method of claim 1, further comprising determining the signal quality to indicate a fair channel above the threshold that would otherwise trigger inter-frequency searching.

4. The method of claim 1, further comprising performing measurements for a preferred closed subscription node.

5. The method of claim 1, further comprising performing measurements for a femtocell.

6. The method of claim 5, further comprising performing measurements for a home base node.

7. The method of claim 1, further comprising enabling the slower repetition rate measurements for the preferred node in response to a determination that user equipment has predefined a preferred node.

8. The method of claim 1, further comprising:
    performing synchronization and measurement for transmissions from the serving node during each discontinuous reception (DRX) cycle; and
    performing the slower repetition rate at multiples of the discontinuous reception (DRX) cycle.

9. The method of claim 1, further comprising:
    accessing information indicative of a location of a mobile device;
    determining proximity to the preferred node; and
    enabling slower repetition rate measurements for the preferred node in response to the proximity being closer than a coverage area threshold.

10. The method of claim 9, further comprising:
    determining the location based upon a positioning system; and
    accessing a geographic location for the preferred node.

11. The method of claim 9, further comprising associating a location of the preferred node as proximate to a coverage area of a macro base node.

12. The method of claim 9, further comprising:
    associating a broadcast beacon with the preferred node; and
    initiating periodic measurements for the preferred node at the slower repetition rate in response to detecting the broadcast beacon.

13. The method of claim 1, further comprising receiving broadcast information from a node identifying the one or more neighboring nodes.

14. The method of claim 1, further comprising receiving self-identifying broadcast information from the preferred node.

15. The method of claim 1, further comprising:
    receiving a scrambling code by broadcast for demodulating a synchronization signal from a node; and
    periodically performing the measurements for the preferred node using the scrambling code.

16. The method of claim 15, further comprising receiving a plurality of scrambling codes for respective neighboring nodes from a serving node.

17. The method of claim 15, further comprising receiving the scrambling code from a non-serving preferred node that transmits using the scrambling code.

18. The method of claim 1, further comprising discontinuing periodically performing the measurements for the preferred node at the slower repetition rate than the measurements for the one or more neighboring nodes in response to camping on the preferred node.

19. The method of claim 1, wherein the serving node is a macro base node, the one or more neighboring nodes are one or more other macro base nodes, and the preferred node is a femtocell or other home base node.

20. The method of claim 1, further comprising refraining from periodically performing the measurements for the preferred node in response to the signal quality being above a second threshold higher than a first threshold.

21. A non-transitory computer-readable medium comprising instructions, which, when executed by a processor, cause the processor to perform operations for reliable and power-efficient discovery of a preferred node, the instructions comprising:
 a first set of instructions for causing a computer to measure signal quality of a wireless channel transmitted by a serving node;
 a second set of instructions for causing the computer to determine the signal quality to be above a threshold, wherein being below the threshold indicates a need to prepare for cell reselection to another neighboring node;
 a third set of instructions for causing the computer to periodically perform measurements for one or more neighboring nodes; and
 a fourth set of instructions for causing the computer to periodically perform measurements for the preferred node, distinct from and higher priority than the serving node and the one or more neighboring nodes, at a slower repetition rate than the measurements for the one or more neighboring nodes in response to the signal quality being above the threshold.

22. An apparatus for reliable and power-efficient discovery of a preferred node, comprising:
 means for measuring signal quality of a wireless channel transmitted by a serving node;
 means for determining the signal quality to be above a threshold, wherein being below the threshold indicates a need to prepare for cell reselection to another neighboring node;
 means for periodically performing measurements for the one or more neighboring nodes; and
 means for periodically performing measurements for the a preferred node, distinct from and higher priority than the serving node and the one or more neighboring nodes, at a slower repetition rate than the measurements for the one or more neighboring nodes in response to the signal quality being above the threshold.

23. An apparatus for reliable and power-efficient discovery of a preferred node, comprising:
 a receiver configured to measure signal quality of a wireless channel transmitted by a serving node;
 at least one processor; and
 at least one memory coupled to the at least one processor, the at least one processor and the at least one memory being configured to:
 determine the signal quality to be above a threshold, wherein being below the threshold indicates a need to prepare for cell reselection to another neighboring node,
 cause the receiver to periodically perform measurements for one or more neighboring nodes, and
 cause the receiver to periodically perform measurements for the preferred node, distinct from and higher priority than the serving node and the one or more neighboring nodes, at a slower repetition rate than the measurements for the one or more neighboring nodes in response to the signal quality being above the threshold.

24. The apparatus of claim 23, the at least one processor and the at least one memory being configured to determine the signal quality to indicate a good channel above the threshold that would otherwise trigger intra-frequency searching.

25. The apparatus of claim 23, the at least one processor and the at least one memory being configured to determine the signal quality to indicate a fair channel above the threshold that would otherwise trigger inter-frequency searching.

26. The apparatus of claim 23, wherein the receiver is further configured to perform measurements for a preferred closed subscription node.

27. The apparatus of claim 23, wherein the receiver is further configured to perform measurements for a femtocell.

28. The apparatus of claim 27, wherein the receiver is further configured to perform measurements for a home base node.

29. The apparatus of claim 23, the at least one processor and the at least one memory being configured to enable the slower repetition rate measurements for the preferred node in response to a determination that user equipment has predefined a preferred node.

30. The apparatus of claim 23, the at least one processor and the at least one memory being configured to perform synchronization and measurement for transmissions from the serving node during each discontinuous reception (DRX) cycle, and for performing the slower repetition rate at multiples of the discontinuous reception (DRX) cycle.

31. The apparatus of claim 23, the at least one processor and the at least one memory being configured to access information indicative of a location of a mobile device, for determining proximity to the preferred node, and for enabling slower repetition rate measurements for the preferred node in response to the proximity being closer than a coverage area threshold.

32. The apparatus of claim 31, the at least one processor and the at least one memory being configured to determine the location based upon a positioning system, and for accessing a geographic location for the preferred node.

33. The apparatus of claim 31, the at least one processor and the at least one memory being configured to associate a location of the preferred node as proximate to a coverage area of a macro base node.

34. The apparatus of claim 31, the at least one processor and the at least one memory being configured to associate a broadcast beacon with the preferred node, and for initiating periodic measurements for the preferred node at the slower repetition rate in response to the receiver detecting the broadcast beacon.

35. The apparatus of claim 23, the receiver being further configured to receive broadcast information from a node identifying the one or more neighboring nodes.

36. The apparatus of claim 23, the receiver being further configured to receive self-identifying broadcast information from the preferred node.

37. The apparatus of claim 23, the receiver being further configured to receive a scrambling code by broadcast for demodulating a synchronization signal from a node, and to periodically perform the measurements for the preferred node using the scrambling code.

38. The apparatus of claim 37, the receiver being further configured to receive a plurality of scrambling codes for respective neighboring nodes from a serving node.

39. The apparatus of claim 37, the receiver being further configured to receive the scrambling code from a non-serving preferred node that transmits using the scrambling code.

40. The apparatus of claim 23, the at least one processor and the at least one memory being configured to discontinue periodically performing the measurements for the preferred node at the slower repetition rate than the measurements for the one or more neighboring nodes in response to camping on the preferred node.

41. A method for facilitating reliable and power-efficient discovery of a preferred node, comprising:
 serving a mobile device as a serving node by transmitting and receiving wireless data packet communication; and facilitating discovery by the mobile device of the preferred node, distinct from and higher priority than the serving node, by broadcasting a scrambling code used by the preferred node to the mobile device, wherein the mobile device periodically performs measurements for the preferred node at a slower repetition rate than measurements for one or more neighboring nodes in response to signal quality being above a threshold.

42. The method of claim 41, further comprising:

maintaining a neighbor list for nodes within a coverage area, wherein the preferred node is one of the nodes; and broadcasting scrambling codes for the nodes within the coverage area.

43. The method of claim 41, further comprising broadcasting the scrambling code by the preferred node for facilitating discovery by the mobile device.

44. The method of claim 41, further comprising scheduling a served mobile device for a discontinuous reception (DRX) cycle for performing synchronization and measurement for transmissions from the serving node and the one or more neighboring nodes and for periodically performing the measurements for the preferred node at the slower repetition rate than the measurements for the one or more neighboring nodes in response to the signal quality being above the threshold.

45. The method of claim 41, further comprising transmitting information related to location enabling the mobile device to selectively perform the measurements for the preferred node at the slower repetition rate.

46. A non-transitory computer-readable medium comprising instructions, which, when executed by a processor, cause the processor to perform operations for facilitating reliable and power-efficient discovery of a preferred node, the instructions comprising:

a first set of instructions for causing a computer to serve a mobile device as a serving node by transmitting and receiving wireless data packet communication; and a second set of instructions for causing the computer to facilitate discovery by the mobile device of the preferred node, distinct from and higher priority than the serving node, by broadcasting a scrambling code used by the preferred node to the mobile device, wherein the mobile device periodically performs measurements for the preferred node at a slower repetition rate than measurements for one or more neighboring nodes in response to signal quality being above a threshold.

47. An apparatus for facilitating reliable and power-efficient discovery of a preferred node, comprising:

means for serving a mobile device as a serving node by transmitting and receiving wireless data packet communication; and means for facilitating discovery by the mobile device of the preferred node, distinct from and higher priority than the serving node, by broadcasting a scrambling code used by the preferred node to the mobile device, wherein the mobile device periodically performs measurements for the preferred node at a slower repetition rate than measurements for one or more neighboring nodes in response to signal quality being above a threshold.

48. An apparatus for facilitating reliable and power-efficient discovery of a preferred node, comprising:

a receiver configured to receive wireless data packet communication service from a mobile device as a serving node;

at least one processor; and at least one memory coupled to the at least one processor, the at least one processor and the at least one memory being configured to access a scrambling code used by the preferred node, distinct from and higher priority than the serving node; and a transmitter configured to broadcast the scrambling code to the mobile device facilitating discovery by the mobile device of a the preferred node, wherein the mobile device periodically performs measurements for the preferred node at a slower repetition rate than measurements for one or more neighboring nodes in response to signal quality being above a threshold.

49. The apparatus of claim 48, the at least one processor and the at least one memory being configured to maintain a neighbor list for nodes within a coverage area, wherein the preferred node is one of the nodes; and the transmitter is further for broadcasting scrambling codes for the nodes within the coverage area.

50. The apparatus of claim 48, the transmitter being further configured to broadcast the scrambling code by the preferred node for facilitating discovery by the mobile device.

51. The apparatus of claim 48, the at least one processor and the at least one memory being configured to schedule a served mobile device for a discontinuous reception (DRX) cycle for performing synchronization and measurement for transmissions from the serving node and the one or more neighboring nodes and to periodically perform the measurements for the preferred node at the slower repetition rate than the measurements for the one or more neighboring nodes in response to the signal quality being above the threshold.

52. The apparatus of claim 48, the transmitter being further configured to transmit information related to location enabling the mobile device to selectively perform the measurements for the preferred node at the slower repetition rate.

* * * * *